Figure 1:
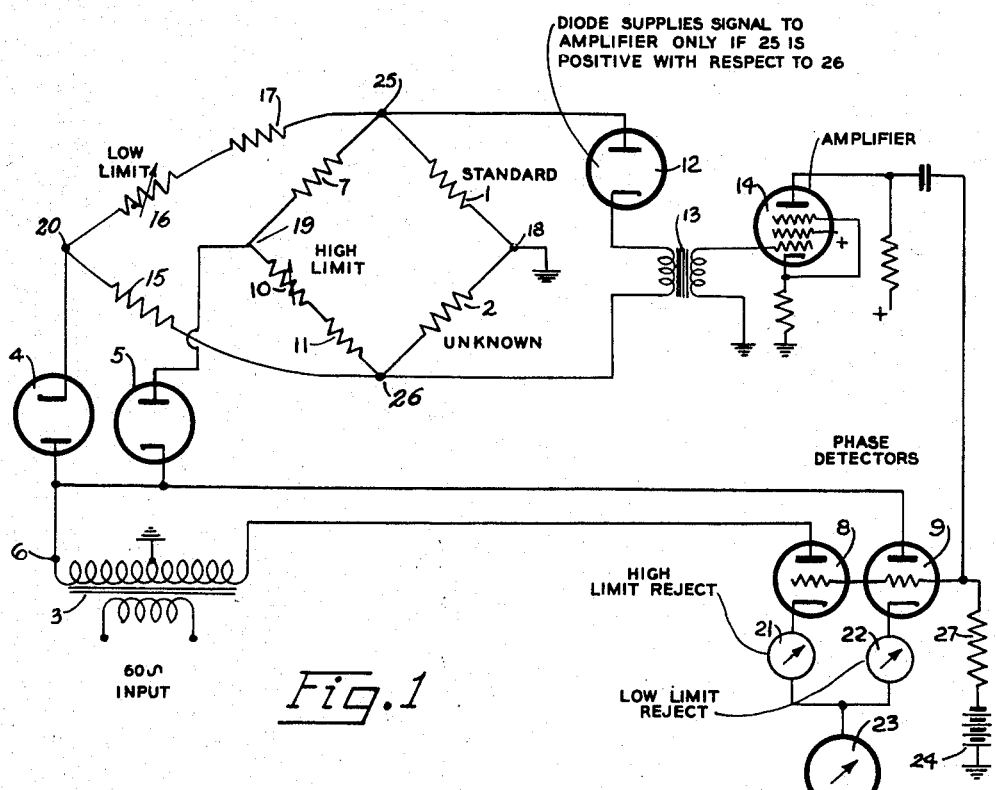

April 25, 1950     D. E. SUNSTEIN     2,505,072
ELECTRICAL SYSTEM

Filed Feb. 3, 1945

INVENTOR.
DAVID E. SUNSTEIN
BY Ostrolenk & Faber
    Samuel Ostrolenk
ATTORNEY

Patented Apr. 25, 1950

2,505,072

UNITED STATES PATENT OFFICE 2,505,072

ELECTRICAL SYSTEM

David E. Sunstein, Elkins Park, Pa., assignor to Philco Corporation, a corporation of Pennsylvania Application February 3, 1945, Serial No. 576,065

6 Claims. (Cl. 175—183)

My invention relates to electrical circuits for the testing of electrical circuit components. In particular, it relates to limit bridges, such as can be used for the limit testing of resistors, capacitors, inductors, vacuum tubes, and other circuit components including impedances, the value of which changes with the voltage across them or the current through them.

In the commercial testing of a large variety of electrical circuit components, it is desired to determine whether or not the members of a large group of supposedly similar components fall within certain tolerances in regard to a specific electrical property of these individual items.

For example, resistors are often tested for their resistance value by such a circuit known as a Wheatstone bridge. This bridge may be arranged so that the operator can determine whether or not the component to be tested is above the high limit or below the low limit, or whether it is within these two limits and is thus acceptable. Thus, it is possible with such circuits to determine whether or not a given resistor lies within a range of plus or minus a given percentage of a standard value.

In one of the well known methods of carrying out such a series of tests, the tests are made in two stages with a standard Wheatstone bridge employed with a different point for balance for each stage of the test. One of these points is the high limit, and one of these points is the low limit. It is then customary for the operator to apply a signal to the bridge, and to observe whether or not the resistor under test is higher or lower than the high limit, and likewise after re-setting the bridge, whether or not it is higher or lower than the low limit. Such a system is satisfactory only if a small number of resistors is to be tested.

If, however, the tests involve a large number of samples, this method of testing requires an excessive amount of manual attention on the part of the operator. In such cases it is desirable to have a system for and method of making these tests which is substantially entirely automatic. It is the purpose of my invention to provide such an automatic method of making these tests.

A primary objective of my invention therefore is to provide a means for limit testing resistors automatically so that the indication is apparent almost as soon as the resistor is put into the circuit and without any operation upon the circuit by the operator of the system.

In accordance with this invention it will be possible to place a resistor in a test bridge, and to provide an immediate indication upon suitable indicating mechanisms showing simultaneously whether or not the resistor is within tolerance, and if it is outside of tolerance also showing whether the resistor is too high or too low.

The automatic indicator mechanisms can, in carrying out my invention, be so arranged that they can also act as relays to operate suitable sorting mechanisms, so that the resistors can be sorted in accordance with their electrical quality—that is, in accordance with whether or not they are too high or too low or within tolerance.

The basic principle upon which this invention is based is the application in rapid succession of a signal to two different points on the impedance or Wheatstone bridge, in association with a suitable detecting system which will determine automatically whether or not the resistor is too high or too low for the limit settings in each instance.

These operations are achieved primarily by the energizing of the Wheatstone bridge with alternating current at two different settings through a pair of rectifiers which may be diode or vacuum tubes reversed with respect to each other. One diode feeds one of the settings, and the other diode feeds the second setting of the bridge. The power may be taken from the 60 cycle line and for one half of a cycle power is fed through one of the diodes to one point of the bridge and for another half of the cycle power is fed through the other of the diodes to the other point of the bridge. The detecting means may be coupled to the impedance bridge through a third diode which is so arranged that the amplifier which operates the detector gives an output only under the circumstances that the bridge shall be off balance in one direction.

The output of this amplifier is then fed into a phase detector which is so arranged that if the signal is of one phase, one relay or other indicating mechanism is operated, whereas if the signal from the bridge is of the other phase, another relay or indicating mechanism is operated. It is also possible to arrange the circuits so a third indicating mechanism will be operated in both of the above cited circumstances. This arrangement makes it possible to determine whether or not the resistor being tested is within tolerance, and if not, in which direction it departs from standard.

It is apparent that it is necessary to properly phase these phase detectors so as to properly associate the diodes with the remainder of the circuit. The analysis of this operation of association will be carried out in conjunction with the drawings in which Figure 1 shows a complete circuit diagram of an embodiment of my invention.

Figure 2:
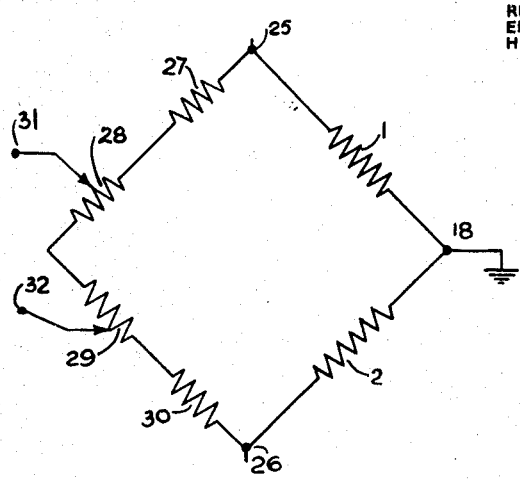

Figure 2 shows an alternative method of arrangement of the impedance or Wheatstone bridge which may be used in Figure 1.

Referring now to Figure 1, I have illustrated my invention as applied to resistor tests. As shown in this figure, the standard impedance such as resistor 1, against which the unknowns are to be compared, is used as one branch of a double impedance bridge. The unknown resistor 2 occupies an adjacent branch in the impedance bridge. Standard resistor 1 and the unknown resistor 2 constitute common branches of a double bridge.

In one of these double bridges, the other two branches are formed by resistor 7 and resistors 10 and 11 in series, in which resistors 7 and 11 are preferably equal and resistor 10 functions as a high limit resistor as will be explained hereinafter. In the other bridge, the other two branches are formed by resistors 16 and 17 in series, in conjunction with resistor 15 in which resistors 17 and 15 are preferably equal and resistor 16 functions as a low limit resistor as will be explained more fully hereinafter. In the first bridge in which resistors 15, 16 and 17 form two branches, resistors 7, 10 and 11 form a shunting impedance across the bridge output. In the second bridge in which resistors 7, 10 and 11 form two branches, resistors 15, 16 and 17 form a shunting impedance across the bridge output.

The junction point 19 of the first set of resistors 7, 10 and 11 is fed through diode 5 from the secondary terminal 6 of transformer 3. Likewise the common point 20 of resistors 15, 16 and 17 is fed from the secondary terminal 6 of transformer 3 through diode 4. Junction 18 of the standard and the unknown resistors is grounded.

Under the circumstance of perfect balance of the bridge, junction points 25 and 26 will be of equal potential. To detect balance and direction of unbalance, the detector is connected across these two points.

This detector is composed of a diode 12, a transformer 13, an amplifying tube 14 with its associated bias supplies, resistors, etc. and the phase detectors composed of triodes 8 and 9 and their associated equipment. This associated equipment consists primarily of the grid bias supply 24 and its series resistor 27, a high limit reject relay, meter, or other reject indicating device 21, a low limit reject meter, relay, or other reject indicating device 22, and a universal reject indicating device 23. The plates of the two phase detecting tubes 8 and 9 are fed from opposite ends of the secondary of transformer 3. The ground positions are as indicated in the diagram. The primary or secondary of transformer 13 may be loaded by a resistor, or other similar design expedients may be used to assure that there is no substantial phase change in the amplifier system.

The operation of this is as follows: Consider now the ½ cycle during which junction point 6 is positive with respect to ground. Under these circumstances the plate of triode 9 will be positive with respect to ground and the plate of triode 8 will be negative with respect to ground. Triode 9 is then prepared to be conductive but triode 8 cannot under any circumstance conduct. Simultaneously diode 4 is conductive because of the polarity and consequently power is supplied to the impedance bridge between junction point 20 and ground point 18. The bridge then is composed of the standard 1, the unknown 2, resistor 15, and the low limit resistors 16 and 17.

Resistor 16 is so adjusted that if the unknown 2 is at the low limit, that is, a certain percentage below the standard, the bridge is balanced and no voltage appears between point 25 and 26. If now the unknown 2 should be too high in resistance for perfect balance, then junction point 26 rises in potential since junction point 20 is positive with respect to ground.

It is to be observed, however, that diode 12 will not pass current under these circumstances. Therefore nothing happens in the circuit—that is, no signal is put into the amplifier 14, no signal is put onto the grid of tube 9, no current flows in relay or lamp 23 or 22. Thus, when the low limit test is being applied if the unknown is above the low limit, no indication is received on the output of the detector.

If, however, the unknown is lower than the low limit, then junction point 26 is negative with respect to junction point 25. Diode 12 thereupon becomes conductive and a signal current will flow through the primary of transformer 13. The current in the secondary of transformer 13 will excite amplifier tube 14 and a signal will be impressed onto the grid of the phase detector tube 9.

This signal must be of such a polarity that tube 9 will conduct, causing an indication upon relay 22 and relay 23. The proper polarity of course, can be obtained by the proper connection of transformer 13. It will be recalled that during the half cycle here in discussion, the positive potential at point 6 has prepared tube 9 to conduct. However, the battery 24 has held the grid of tube 9 below cut off. The signal from the amplifier 14 now raises this grid potential above cut off and current flows in tube 9 giving the indication on indicator 22 and indicator 23.

Thus, under these circumstances, if the unknown is lower than the low limit, indicators 22 and 23 operate. Indicator 22 shows that the resistor being tested is below the low limit, and indicator 23 shows that it is outside either of the limits set as will be more clear from the following.

A half a cycle later than the above sequence, junction point 6 will become negative with respect to ground. Under these circumstances, phase detector 9 will not operate because its plate will have a negative voltage supplied to it. Phase detector 8, however, will now become operative because its plate voltage is positive—that is, it is prepared for operation if a signal is applied to the grid.

With junction point 6 negative with respect to ground, diode 5 becomes operative and power is fed into the impedance bridge between junction 19 and 18. Under this condition, junction 19 is below ground potential. The bridge is now composed of standard resistor 1 and unknown 2, resistor 7, and the high limit resistors 10 and 11. Resistor 10 is adjustable in order to enable the high limit value to be adjusted readily.

Consider now that the unknown is higher in value than the standard resistor—that is, higher than the certain percentage allowed for by the high limit setting. In that case, junction point 25 will have a potential closer to ground than junction 26 and junction 26 will be more negative than junction 25. Consequently diode 12 will conduct and a signal will be transmitted through transformer 13 and through amplifier 14 to the grid of the phase detector. Transformer 13, connected properly as previously described, will now supply voltage of positive polarity to the grid of tube 8—that is, more positive than the bias established by battery 24. Since the voltage on the plate of tube 8 is positive, and the grid voltage has gone above cut-off, current will pass through limit reject indicator 21 and also through limit reject indicator 23. Thus, with the unknown higher than the high limit, indicators 21 and 23 will operate. Here again the operation of indicator 21 indicates that the unit under test is above the high limit. If indicator 23 operates, it again indicates that the unit under test is outside of limit.

If the unknown should be below the high limit, the polarity of the unbalance between junction point 25 and 26 is reversed. Under these circumstances diode 12 will not pass current and no signal will be transmitted to the amplifier through transformer 13. Therefore no signal will be received on the grids of the phase detectors, and therefore no indication will appear on any other relays or lamps.

It is now evident that during one of the ½ cycles, the low limit test is applied, and that during the other ½ cycle the high limit test is applied. Since these ½ cycles follow one another in rapid succession—that is, at the rate determined by the frequency of the power source here designated as 60 cycles, it is apparent that the time factor in the application of these tests is substantially negligible.

Thus, in rapid succession I apply the high limit test and the low limit test, then the high limit test, then the low limit test, etc. If the unit being tested is within tolerance, none of the rejects indicating mechanisms will operate. If the unit under test is below the low limit, indicators 22 and 23 operate.

These units, of course, receive pulses of current only every other ½ cycle. But suitable arrangements can be made so that these pulses of current can be smoothed, if necessary, into sufficiently steady D. C. current which can be used to operate conventional relays or other such devices. Such smoothing circuits are common in the radio and industrial electronics art.

Likewise, if the resistor under test is above the high limit, indicators 21 and 23 become operative. Here again, the current through these fundamentally will consist of a series of pulses occurring once every other half cycle. But these pulses can be smoothed out, if necessary, into a sufficiently steady D. C. by suitable smoothing circuits such as are common in the electronics art.

Any well known means may be employed for automatically inserting successive unknown in the circuit between the junction points 18 and 26. Practically at once after each unit is inserted, there will be provided an indication at the three indicators 21, 22 and 23. If indicator 23 operates, it is known that the unit in question is outside of tolerance. If indicator 21 operates also, it will be known that the lack of tolerance is caused by the resistor being too high. If indicator 22 operates, it will be known that the lack of tolerance is caused by the resistor being too low. These indicators may, of course, be lamps so as to give a visual indication or they can be electro-magnets arranged to operate suitable chutes and trap doors so that the resistor upon being released from the testing mechanism, can be allowed to fall through the chute and will be sorted and directed into the proper receptacle.

Thus it will become possible by mechanical mechanisms to automatically feed successive resistors into a limit test bridge embodying this circuit, to have the circuit perform the desired tests on the resistor practically instantaneously, to have the results of these tests operate electromagnetic devices which will operate trap doors, or selective gates in mechanical chutes, and then to have the resistor released so that it will fall into the appropriate box. The speed of such an automatic sorting mechanism will be controlled primarily by the speed of the electromagnetic devices within the system and not by the speed of the limit test bridge. The accuracy of the test is substantially independent of line voltage, amplifier gain, etc., and is determined principally by the accuracy of the various impedances in the bridge.

An alternative method of arrangement of the Wheatstone bridge circuit is shown in Figure 2. In this circuit one pair of arms of the bridge is as before, namely, standard resistor 1 and an unknown unit 2. The other pair of arms of the bridge is composed of resistors 27, 28, 29 and 30. A sliding tap on resistor 28 provides junction point 31 which is the high limit junction point and is connected to diode 5. Thus, junction point 31 takes the place of junction point 19 in the circuit of Figure 1.

Likewise, a sliding tap on resistor 29 provides a junction point 32 which is the low limit junction point. Junction point 32 thus takes the place of junction point 20 in Figure 1 and will be fed from diode 4. Otherwise the operation of this circuit is exactly the same as the operation of the circuit of Figure 1.

My invention has been described in what has gone before in terms of the specific circuit of Figures 1 and 2 and for measuring resistances. However, it will be obvious that my system may be employed for measuring other electrical characteristics. To indicate the general utility of my invention, it is evident that the unknown 2 may consist of the plate to cathode circuit of a vacuum tube or of a pair of oppositely poled vacuum tubes the potential of whose grids is established by the value of the sample being tested. The element connected in place of the unknown 2 need not maintain a constant value of resistance as the voltage across it, or the current through it, is varied. Furthermore, two of the elements of the bridge may comprise potential sources rather than impedances used to provide potential drops.

Moreover, since there may be modifications of these circuits which will still embody the fundamental element of my invention, I prefer to have my invention limited not by the foregoing description but by the following claims.

I claim:

1. In a system for measuring electrical characteristics, a bridge circuit having output terminals and an input terminal, and comprising four branches, two additional branches, each having a terminal connected to each other, and forming a second input terminal, the opposite terminal of one of said additional branches being connected to one of said output terminals of said bridge, the opposite terminal of the other of said additional branches being connected to the other of said output terminals, a source of alternating current signal energy, and circuit connections for sequentially connecting said source to said first input terminal and to said second input terminal of said additional branches and an indicator individual to each input terminal and connected to said output terminals, and circuit connections from said source to said indicators for sequentially energizing each of said indicators in synchronism with the application of said energy to the associated input.

2. In a system for measuring electrical characteristics, a bridge circuit having input and output terminals and comprising four branches, one of said branches comprising an electrical unit having unknown characteristics, the next adjacent branch connected to said one branch comprising a standard electrical unit against which the unknown is to be compared, one terminal of each of said branches being connected to each other and the opposite terminal of each of said branches being connected respectively to the output terminals of said bridge, the third and fourth branches each comprising an electrical unit, the fourth branch including a high limit electrical unit which will unbalance said bridge when the unknown exceeds a predetermined high characteristic of the characteristic being measured, one terminal of the third and fourth branch being connected to each other and comprising a first input terminal of said bridge and the opposite terminals of said third and fourth branch being connected to the output terminals of said bridge, two additional branches, each having a terminal connected to each other, and forming a second input terminal, the opposite terminal of one of said additional branches being connected to one of said output terminals of said bridge, the opposite terminal of the other of said additional branches being connected to the other of said output terminals, one of said additional branches comprising a low limit electrical unit which will unbalance said bridge when the unknown is below a predetermined low limit characteristic of the characteristic being measured, and being connected to the opposite output terminal from that of said high limit unit, a source of alternating current signal energy, and means including circuit connections for sequentially applying energy from said source to said first input terminal and then to said connected second input terminal of said additional branches and a common indicator means connected to said output terminals.

3. In a system for measuring electrical characteristics, a bridge circuit having input and output terminals and comprising four branches, one of said branches comprising an electrical unit having unknown characteristics, the next adjacent branch connected to said one branch comprising a standard electrical unit against which the unknown is to be compared, one terminal of each of said branches being connected to each other and the opposite terminal of each of said branches being connected respectively to the output terminals of said bridge, the third and fourth branches each comprising an electrical unit, the fourth branch including a high limit electrical unit which will unbalance said bridge when the unknown exceeds a predetermined high characteristic of the characteristic being measured, one terminal of the third and fourth branch being connected to each other and comprising a first input terminal of said bridge and the opposite terminals of said third and fourth branch being connected to the output terminals of said bridge, two additional branches, each having a terminal connected to each other, and forming a second input terminal, the opposite terminal of one of said additional branches being connected to one of said output terminals of said bridge, the opposite terminal of the other of said additional branches being connected to the other of said output terminals, one of said additional branches comprising a low limit electrical unit which will unbalance said bridge when the unknown is below a predetermined low limit characteristic of the characteristic being measured, and being connected to the opposite output terminal from that of said high limit unit, a source of alternating current signal energy, means including circuit connections for sequentially applying energy from said source to said input terminals and to said connected terminal of said additional branches, a first and second indicator connected to said output terminals, and means for sequentially applying energy from said source to said first and second indicators to render them sequentially responsive to the output of said bridge circuit in synchronism with the sequential application of energy from said source to their associated input terminals.

4. In a system for measuring electrical characteristics, a bridge circuit having input and output terminals and comprising four branches, one of said branches comprising an electrical unit having unknown characteristics, the next adjacent branch connected to said one branch comprising a standard electrical unit against which the unknown is to be compared, one terminal of each of said branches being connected to each other and the opposite terminal of each of said branches being connected respectively to the output terminals of said bridge, the third and fourth branches each comprising an electrical unit, the fourth branch including a high limit electrical unit which will unbalance said bridge when the unknown exceeds a predetermined high characteristic of the characteristic being measured, one terminal of the third and fourth branch being connected to each other and comprising a first input terminal of said bridge and the opposite terminals of said third and fourth branch being connected to the output terminals of said bridge, two additional branches, each having a terminal connected to each other, and forming a second input terminal, the opposite terminal of one of said additional branches being connected to one of said output terminals of said bridge, the opposite terminal of the other of said additional branches being connected to the other of said output terminals, one of said additional branches comprising a low limit electrical unit which will unbalance said bridge when the unknown is below a predetermined low limit characteristic of the characteristic being measured, and being connected to the opposite output terminal from that of said high limit unit, a source of alternating current signal energy, means including circuit connections for sequentially applying energy from said source to said input terminals and to said connected terminal of said additional branches, comprising a pair of rectifiers, one of said rectifiers being connected between said source and said first input terminal and transmitting one half wave from said source and the other of said rectifiers being connected between said source and the second input terminal and transmitting the other half wave from said source for sequentially applying energy from said source to said input terminals, a first and second indicator comprising a high and low indicator connected to said output terminals, one of said indicators being energizable by one half of the wave from said source and the other of said indicators being energizable by the other half of the wave from said source, and circuit connections from said source to said indicators for rendering said indicators sequentially operative in synchronism with said intermittent applications of said energy, to the corresponding input terminals.

5. In a system for measuring electrical characteristics, a bridge circuit having input and output terminals and comprising four branches, terminals of two of said branches comprising the output terminals and a common terminal of two of said branches comprising one of said input terminals, two additional branches, each having a terminal connected to each other and comprising the other of said input terminals, the opposite terminal of one of said additional branches being connected to one of said output terminals of said bridge, the opposite terminal of the other of said additional branches being connected to the other of said output terminals, a source of alternating current signal energy connected to said one of said input terminals and to the other of said input terminals, means for sequentially applying energy from said source to said one of said input terminals and the other of said input terminals, a common indicator means connected to said output terminals comprising a high and low indicator, and circuit connections from said indicator to said source for rendering said indicators operative in synchronism with said intermittent applications of said energy to the corresponding input terminals.

6. In a system for measuring electrical characteristics, a bridge circuit having input and output terminals and comprising four branches, terminals of two of said branches comprising the output terminals and a common terminal of two of said branches comprising one of said input terminals, two additional branches, each having a terminal connected to each other and comprising the other of said input terminals, the opposite terminal of one of said additional branches being connected to one of said output terminals of said bridge, the opposite terminal of the other of said additional branches being connected to the other of said output terminals, a source of alternating current signal energy, a diode connecting said source to said one of said input terminals, a diode connecting said source to said other of said input terminals, said diodes being connected in reverse for sequentially applying energy from said source to said one of said input terminals and said other of said input terminals, a common indicator connected to said output terminals comprising a high and low indicator, one of said indicators being energizable by a positive wave and the other by a negative wave, and circuit connections from said source to said indicators for rendering said indicators operative in synchronism with said intermittent applications of said energy.

DAVID E. SUNSTEIN.

REFERENCES CITED

The following references are of record in the file of this patent:

UNITED STATES PATENTS

| Number | Name | Date |
| --- | --- | --- |
| 1,665,397 | Wunsch | Apr. 10, 1928 |
| 1,743,386 | Paulson | Jan. 14, 1930 |
| 1,931,054 | Butterfield | Oct. 17, 1933 |
| 1,951,461 | Wilson | Mar. 20, 1934 |
| 2,060,849 | Bullard | Nov. 17, 1936 |
| 2,153,989 | Paulson | Apr. 11, 1939 |

OTHER REFERENCES

Instruments, April 1941, pages 89-90.

Review of Scientific Instruments, vol. 13, July 1942, pages 277-281.

Radio News, October 1944, pages 40, 41, 100, 102 and 104.